(12) United States Patent
Koike et al.

(10) Patent No.: US 9,493,095 B2
(45) Date of Patent: Nov. 15, 2016

(54) SEAT

(71) Applicant: TACHI-S CO., LTD., Akishima-shi, Tokyo (JP)

(72) Inventors: Atsushi Koike, Ome (JP); Tomohiro Amano, Ome (JP); Atsushi Ishii, Ome (JP); Kotaro Kumagai, Ome (JP)

(73) Assignee: TACHI-S CO., LTD, Tokyo (JP)

( * ) Notice: Subject to any disclaimer, the term of this patent is extended or adjusted under 35 U.S.C. 154(b) by 0 days.

(21) Appl. No.: 14/546,640

(22) Filed: Nov. 18, 2014

(65) Prior Publication Data

US 2015/0137571 A1 May 21, 2015

(30) Foreign Application Priority Data

Nov. 18, 2013 (JP) .................................. 2013-237580

(51) Int. Cl.
| | |
|---|---|
| *B60N 2/16* | (2006.01) |
| *B60N 2/20* | (2006.01) |
| *B60N 2/22* | (2006.01) |
| *B60N 2/64* | (2006.01) |
| *B60N 2/68* | (2006.01) |
| *B60N 2/48* | (2006.01) |
| *B60N 2/02* | (2006.01) |

(52) U.S. Cl.
CPC ................ *B60N 2/1635* (2013.01); *B60N 2/16* (2013.01); *B60N 2/162* (2013.01); *B60N 2/22* (2013.01); *B60N 2/2231* (2013.01); *B60N 2/2245* (2013.01); *B60N 2/4829* (2013.01); *B60N 2/643* (2013.01); *B60N 2/646* (2013.01); *B60N 2/68* (2013.01); *B60N 2002/024* (2013.01); *B60N 2002/2204* (2013.01)

(58) Field of Classification Search
CPC .................. A47C 7/402; B60N 2/643; B60N 2002/2204; B60N 2/16; B60N 2/20; B60N 2/22; B60N 2/686; B60N 2/646
USPC ................. 297/353, 362.11, 452.33, 452.34, 297/452.29, 452.3, 452.31, 452.32, 452.35, 297/440.15, 440.16, 354.1, 354.11, 354.12, 297/358, 361.1, 408, 343
See application file for complete search history.

(56) References Cited

U.S. PATENT DOCUMENTS 490,637 A * 1/1893 Butler .................... A47C 7/506
188/185

(Continued)

FOREIGN PATENT DOCUMENTS

| JP | 2008253609 A | 10/2008 |
|---|---|---|
| JP | 2008254645 A | 10/2008 |
| JP | 2012143634 A | 8/2012 |

*Primary Examiner* — Rodney B White
(74) *Attorney, Agent, or Firm* — Cantor Colburn LLP

(57) ABSTRACT

A seat cushion is arranged on a riser. A strut is coupled, at lower end, to the rear end of the riser, and is provided at the back of the seat cushion. The seatback is secured to the strut, and is isolated from the seat cushion. The seatback and the seat cushion can therefore move, independent of each other. The seatback or the seat cushion, or both are lifted or lowered by a lifting/lowering means. Thus, the seatback and the seat cushion are lifted or lowered relative to each other. The lower half of the seatback, which supports the hips and lower ribs in the main, is made narrow than the upper half that supports the shoulder blades in the main. The seat cushion has, in the middle part of the rear end, a U-notch which loosely holds the narrow lower half.

18 Claims, 10 Drawing Sheets

(56) References Cited

U.S. PATENT DOCUMENTS

| | | | | |
|---|---|---|---|---|
| 3,059,970 A * | 10/1962 | Angell | A61G 15/02 | 297/353 |
| 3,762,769 A * | 10/1973 | Poschl | A47C 7/462 | 297/284.4 |
| 3,794,382 A * | 2/1974 | Bloomfield | A47C 7/282 | 297/452.3 X |
| 4,154,477 A * | 5/1979 | Swenson | A47C 7/402 | 297/353 X |
| 4,181,357 A * | 1/1980 | Swenson | B60N 2/143 | 297/353 |
| 4,616,874 A * | 10/1986 | Pietsch | B60N 2/0232 | 297/343 X |
| 4,616,877 A * | 10/1986 | Slaats | A47C 7/402 | 297/353 |
| 4,632,458 A * | 12/1986 | Brown | A47C 7/402 | 248/404 |
| D289,236 S * | 4/1987 | Brauning | D6/366 | |
| 4,679,854 A * | 7/1987 | Putsch | B60N 2/00 | 297/216.13 |
| 4,787,676 A * | 11/1988 | Neve de Mevergnies | B60N 2/028 | 297/353 X |
| 4,902,070 A * | 2/1990 | Casale | A47D 11/02 | 296/68.1 |
| 5,011,225 A * | 4/1991 | Nemoto | B60N 2/4852 | 297/408 |
| 5,018,788 A * | 5/1991 | Cedergreen | A47C 3/16 | 297/378.1 |
| 5,040,848 A * | 8/1991 | Irie | A47C 7/46 | 297/452.31 |
| 5,048,894 A * | 9/1991 | Miyajima | B60N 2/38 | 297/452.35 X |
| 5,085,488 A * | 2/1992 | Dal Monte | B60N 2/5635 | 297/452.31 |
| 5,114,209 A * | 5/1992 | Dunn | A47C 7/425 | 297/452.32 X |
| 5,123,706 A * | 6/1992 | Granzow | B60N 2/68 | 297/362.11 |
| 5,316,375 A * | 5/1994 | Breen | A47C 7/425 | 297/452.34 X |
| 5,549,357 A * | 8/1996 | Counts | A61G 5/1067 | 297/354.13 X |
| 5,556,163 A * | 9/1996 | Rogers, III | A47C 1/023 | 297/330 |
| 5,769,498 A * | 6/1998 | Smith | B60N 2/449 | 297/452.34 X |
| 5,836,647 A * | 11/1998 | Turman | B60N 2/4228 | 297/353 X |
| 5,836,648 A * | 11/1998 | Karschin | B60N 2/2222 | 297/354.12 X |
| 5,836,651 A * | 11/1998 | Szerdahelyi | B60N 2/2222 | 297/353 X |
| 6,015,189 A * | 1/2000 | Broadhead | A61G 5/1067 | 297/353 X |
| 6,139,109 A * | 10/2000 | Lajoie | A47C 3/12 | 297/452.34 X |
| 6,390,554 B1 * | 5/2002 | Eakins | A61G 5/006 | 297/317 |
| 6,409,265 B1 * | 6/2002 | Koerlin | A61G 5/006 | 297/325 |
| 6,425,635 B1 * | 7/2002 | Pulver | A61G 5/107 | 297/343 X |
| 6,450,581 B1 * | 9/2002 | Koerlin | A61G 5/12 | 297/423.26 |
| 6,530,622 B1 * | 3/2003 | Ekern | B60N 2/2222 | 297/354.11 X |
| 6,550,858 B1 * | 4/2003 | Grohs | B60N 2/4256 | 297/452.33 X |
| 6,578,917 B1 * | 6/2003 | Aubert | B60N 2/002 | 297/362.11 |
| 6,695,378 B2 * | 2/2004 | Hanagan | B60N 2/3043 | 296/65.01 |
| 6,702,377 B2 * | 3/2004 | Nakano | B60N 2/4808 | 297/408 X |
| 6,752,464 B1 * | 6/2004 | Tseng | A47C 4/02 | 297/440.16 X |
| 6,817,673 B2 * | 11/2004 | Walker | B60N 2/002 | 297/440.2 |
| 6,969,114 B2 * | 11/2005 | Keilhauer | A47C 7/425 | 297/452.3 |
| 7,021,706 B2 * | 4/2006 | Aufrere | B60N 2/7029 | 297/216.13 |
| 7,021,710 B2 * | 4/2006 | Kain | B60N 2/2851 | 297/440.15 X |
| 7,040,708 B2 * | 5/2006 | Black | B60N 2/24 | 297/452.34 |
| 7,168,765 B2 * | 1/2007 | Meiller | B60N 2/242 | 297/452.34 X |
| 7,237,847 B2 * | 7/2007 | Hancock | B60N 2/0228 | 297/362.11 X |
| 7,255,395 B2 * | 8/2007 | Garrido | B60N 2/0232 | 297/343 X |
| 7,296,856 B2 * | 11/2007 | Rozaieski | A61G 5/1067 | 297/354.12 |
| 7,401,855 B2 * | 7/2008 | Kohl | B60N 2/4415 | 297/284.1 |
| 7,488,026 B1 * | 2/2009 | Jovicevic | B60N 2/0725 | 296/65.13 |
| 7,497,514 B2 * | 3/2009 | Ramsey | A47C 4/52 | 297/17 |
| 7,547,068 B2 * | 6/2009 | Davis | B60N 2/2222 | 297/354.12 X |
| 7,611,199 B2 * | 11/2009 | Michalak | B60N 2/0232 | 297/284.9 |
| 7,686,394 B2 * | 3/2010 | Nishikawa | B60N 2/2222 | 297/354.11 X |
| 7,780,230 B2 * | 8/2010 | Serber | B60N 2/0745 | 297/353 X |
| 8,262,163 B2 * | 9/2012 | Wu | A47C 1/035 | 297/353 X |
| 8,646,795 B2 * | 2/2014 | Cerreto | A61G 5/1067 | 297/354.12 X |
| 8,690,249 B2 * | 4/2014 | Kang | A47C 7/402 | 297/353 |
| 8,857,908 B2 * | 10/2014 | Brncick | B60N 2/0232 | 297/452.31 X |
| 8,876,206 B2 * | 11/2014 | Yamaguchi | B60N 2/4228 | 297/230.12 |
| 8,936,317 B2 * | 1/2015 | Yamaguchi | B60N 2/4228 | 297/452.31 |
| 8,979,203 B1 * | 3/2015 | Sutter, Jr. | B60N 2/4844 | 297/408 |
| 9,061,616 B2 * | 6/2015 | Kondrad | B60N 2/22 | |
| 9,090,189 B2 * | 7/2015 | Kulkarni | B60N 2/643 | |
| 9,096,147 B2 * | 8/2015 | Kulkarni | B60N 2/028 | |
| 9,381,840 B2 * | 7/2016 | Tobata | B60N 2/643 | |
| 2001/0052722 A1 * | 12/2001 | Amorin | B60N 2/20 | 297/378.1 |
| 2004/0056517 A1 * | 3/2004 | Farber | A47C 4/20 | 297/17 |
| 2004/0195895 A1 * | 10/2004 | Sedlatschek | A47C 7/38 | 297/408 |
| 2005/0189810 A1 * | 9/2005 | Wu | A47C 7/38 | 297/452.29 |
| 2006/0082208 A1 * | 4/2006 | Beermann | B60N 2/22 | 297/452.11 |
| 2006/0138848 A1 * | 6/2006 | Balensiefer | B60N 2/2866 | 297/440.16 |
| 2006/0186719 A1 * | 8/2006 | Davis | B60N 2/2222 | 297/353 |
| 2006/0250008 A1 * | 11/2006 | Kohl | A47C 7/46 | 297/452.33 X |
| 2006/0261656 A1 * | 11/2006 | Davis | B60N 2/4808 | 297/353 |
| 2008/0079298 A1 * | 4/2008 | Whelan | A47C 7/405 | 297/284.2 |
| 2008/0136240 A1 * | 6/2008 | Matthews | B60N 2/4235 | 297/354.1 |
| 2009/0051202 A1 * | 2/2009 | Ozeki | B60N 2/20 | 297/341 |
| 2009/0236884 A1 * | 9/2009 | Lawall | B60N 2/22 | 297/354.12 X |

(56) References Cited

U.S. PATENT DOCUMENTS

| | | | | |
|---|---|---|---|---|
| 2010/0231013 A1* | 9/2010 | Schlenker | ............ | B60N 2/0232 297/353 X |
| 2010/0244525 A1* | 9/2010 | Ito | ......................... | B60N 2/0232 297/353 |
| 2011/0241403 A1* | 10/2011 | Yamaguchi | .......... | B60N 2/4228 297/452.31 |
| 2011/0279282 A1* | 11/2011 | Bryant | ..................... | B60N 2/06 340/686.1 |
| 2013/0088066 A1* | 4/2013 | Sasaki | ...................... | B60N 2/16 297/452.38 |
| 2013/0328364 A1* | 12/2013 | Cecinas | ................... | B60N 2/20 297/354.1 X |
| 2014/0203611 A1* | 7/2014 | Kondrad | ................... | B60N 2/22 297/354.12 |
| 2014/0239695 A1* | 8/2014 | Miller | ...................... | B60N 2/20 297/378.12 |
| 2015/0080994 A1* | 3/2015 | Ho | ......................... | A47C 7/46 297/452.3 X |

* cited by examiner

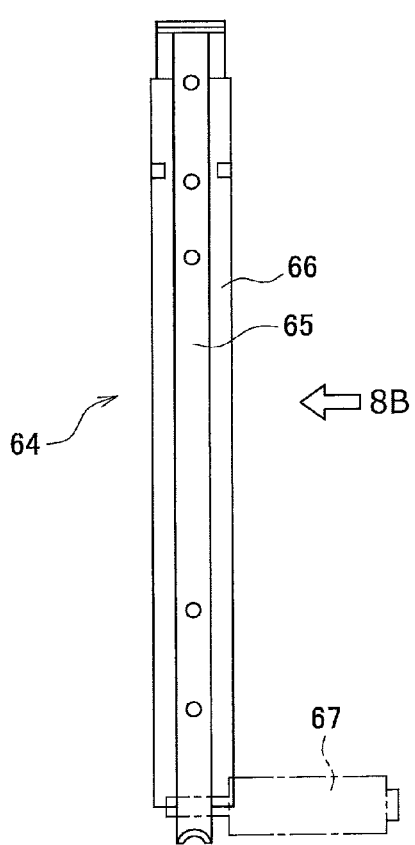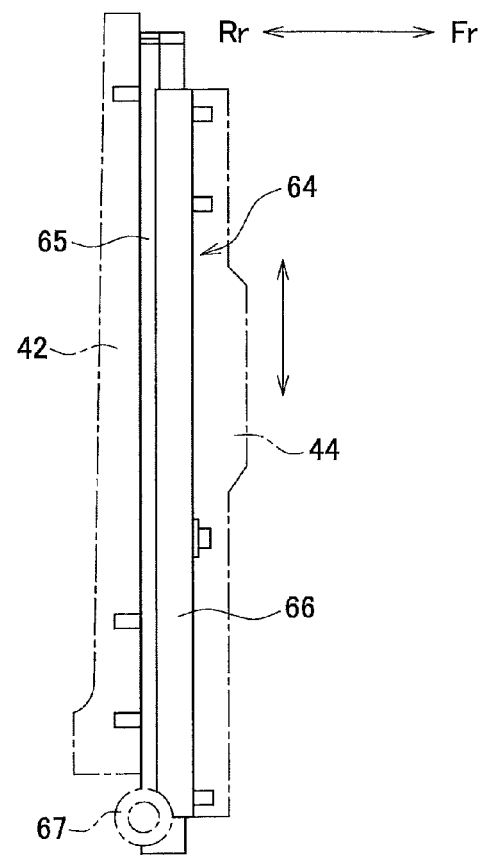

SEAT

CROSS-REFERENCE TO RELATED APPLICATIONS

This application is based upon and claims the benefit of priority from the prior Japanese Patent Application No. 2013-237580, filed Nov. 18, 2013, the entire contents of which are incorporated herein by reference.

BACKGROUND OF THE INVENTION

1. Field of the Invention

This invention relates to a seat having a seatback that can be lifted and lowered and adjusted in position with respect to a seat cushion in accordance with the physique of the occupant.

2. Description of the Related Art

A vehicle seat is known, which has a seatback which front surface (seat surface) is shaped in conformity with the back of the occupant, to make the occupant feel that his or her back well fit in the seat. To make another occupant feel comfortable in the vehicle seat, the seatback must be lifted or lowered in accordance with this occupant's physique, particularly the height, thus adjusting the seat surface of the seatback in terms of position.

Of most seats, the seatback is coupled at the lower edge to the rear edge of the seat cushion by a reclining device. Inevitably, the seatback cannot be lifted or lowered with respect to the seat cushion. This is why any vehicle seat, the seatback of which can be adjusted in position (i.e., seat surface) in accordance with the occupant's physique (height), is divided into upper and lower halves. The lower half of the seatback is coupled to the seat cushion, and the upper half of the seatback is lifted or lowered with respect to the lower half.

JP 2008-253609A, for example, discloses a seat. Of this seat, the seatback is divided into upper and lower halves. The lower half supports mainly the waist and lower ribs of the occupant. The upper half supports mainly the occupant's shoulder blades, and is coupled to the lower half and can be lifted and lowered. To the upper edge of the upper half of the seatback, a headrest is secured. The upper half of the seatback incorporates a height adjusting mechanism for adjusting the height of the headrest. The upper half of the seatback is coupled to a pair of stays of the headrest, and can be lifted or lowered as the headrest is lifted or lowered. As the height adjusting mechanism is manipulated, the headrest is lifted or lowered. The upper half of the seatback is thereby lifted or lowered to the position that accords with the occupant's physique (height). The upper half of the seatback is thus adjusted in terms of height.

The headrest can be lifted to a level higher than the upper half of the seatback, and can therefore reliably support the occupant's head even if the occupant is of large physique, having the head much spaced from the shoulder blades.

JP 2008-254645A discloses a seat, too. The seatback of this seat is also divided into upper and lower halves. The upper half of the seatback incorporates a height adjusting mechanism configured to lift and lower the seatback with respect to the lower half of the seatback, and also an angle adjusting mechanism configured to adjust the angle at which the upper half is inclined to the lower half. The height adjusting mechanism therefore lifts or lowers the upper half of the seatback to the position that accords with the occupant's physique. Thus, the upper half of the seatback is adjusted in height. The angle adjusting mechanism adjusts the inclination of the upper half of the seatback in accordance with the occupant's physique, not only setting the occupant's line of sight appropriately, but also making the occupant feel that his or her back well fit in the seat.

Another type of a seat is known, the seatback of which is isolated from the seat cushion, not coupled at lower edge to the rear edge of the seat cushion. JP 2012-143634A, for example, discloses an office seat, not a vehicle seat. The seat-cushion frame of this office seat is mounted on the base (i.e., riser), and an L-shaped support is secured by a link to the base and seat-cushion frame. The seatback is secured to the front of the seatback support. If the occupant sits shallow in the seat, the lower half of the seatback will move forward to support the occupant's waist. If the occupant sits deep in the seat, the lower half of the seatback will move backward, not preventing the occupant from sitting deep. Thus, the occupant feels well fit in the seat, whether he or she sits shallow or deep in the seat.

If the seatback is divided into upper and lower halves and if the lower half is coupled to the seat cushion and the upper half is lifted or lowered with respect to the lower half, the upper and lower halves will be spaced apart, providing a gap between them. In consequence, the occupant cannot feel well fit at the seat surface of the seatback.

A seat lifter may be provided between the riser (i.e., base) and the seat cushion. In this case, the distance between the lifted and lowered positions of the seatback, i.e., height-adjusting range, can be long that occupants of various physique may feel well fit in the seat. If the seat lifter is driven, however, not only the seat cushion and the seatback will be lifted or lowered, but also the top surface (seat surface) of the seat cushion and the front surface (seat surface) of the seatback will move forward or backward. As a result, the occupant cannot feel well fit at the seat surface of the seatback.

If the lower edge of the seatback is not coupled to the rear edge of the seat cushion and the seatback is spaced apart from the seat cushion, the occupant can feel that the waist is well fit in the seat, whether sitting shallow or deep in the seat. However, the seatback is not configured to lift or lower.

If isolated from the seat cushion, the seatback can indeed be lifted and lowered and can be adjusted in position (i.e., position of its seat surface) in accordance with the occupant's physique. If the seatback is lifted or lowered, however, its lower half supporting the occupant's waist will change in position, failing to make the occupant to feel that the waist is well fit in the seat. The configuration in which the seatback can be lifted and lowered cannot be employed.

In any conventional configuration described above, the seatback cannot be adjusted in position in accordance with the occupant's physique, inevitably failing to make the occupant feel well fit at the seat surface.

An object of this invention is to provide a seat in which the seatback can be adjusted in position (at its seat surface) in accordance with the occupant's physique to enable the occupant to feel well fit at the seat surface.

SUMMARY OF THE INVENTION

To achieve the object specified above, in the seat according to this invention, the seatback is an integral component, not divided into upper and lower halves. The lower end of the seatback is isolated from the seat cushion, not coupled to the rear end of the seat cushion. The seat cushion and the seatback are configured to move up and down relative to each other. Measures are taken at the rear end of the seat cushion and the lower end of the seatback, to provide no gap between the rear end of the seat cushion and the lower end of the seatback when the seat cushion and the seatback move relative to each other.

According to claim 1, a seat for use by an occupant, the seat comprises a riser used as a base; a seat cushion arranged on the riser; a strut coupled at lower end to a rear end of the riser and provided at the rear of the seat cushion; a seatback secured to the strut and at the front surface thereof configured to hold the occupant's hips, lower ribs and shoulder blades; and a lifting/lowering means for lifting and lowering the seat cushion and the seatback relative to each other, wherein the seatback comprises a lower half structured to support the occupant's hips and lower ribs, and an upper half, integral with the lower half, structured to support the occupant's shoulder blades, the lower half being narrower than the upper half, the seat cushion has a U-notch structured to hold the narrow lower half in a middle part of a rear end to lift and lower the seat cushion and the seatback relative to each other, left and right parts of the rear end of the seat cushion bulge to support the occupant's buttocks from the left and right sides and are located between the left and right sides of the U-notch.

In this invention, the lower half of the seatback is narrower than the upper half, the seat cushion has a U-notch in a middle part of the rear end, and the lower half of the seatback is loosely held in the U-notch. No gap is therefore made between the rear end of the seat cushion and the lower end of the seatback. As the seat cushion and the seatback are lifted or lowered relative to each other, the seatback (seat surface) is adjusted in position in accordance with the occupant's physique.

BRIEF DESCRIPTION OF THE DRAWINGS

FIG. 8A is a rear view of a seatback lifting/lowering mechanism;

FIG. 8B is a side view of the seatback lifting/lowering mechanism, as viewed in the direction of arrow 8B shown in FIG. 8A;

DETAILED DESCRIPTION OF THE INVENTION

Figure 1:
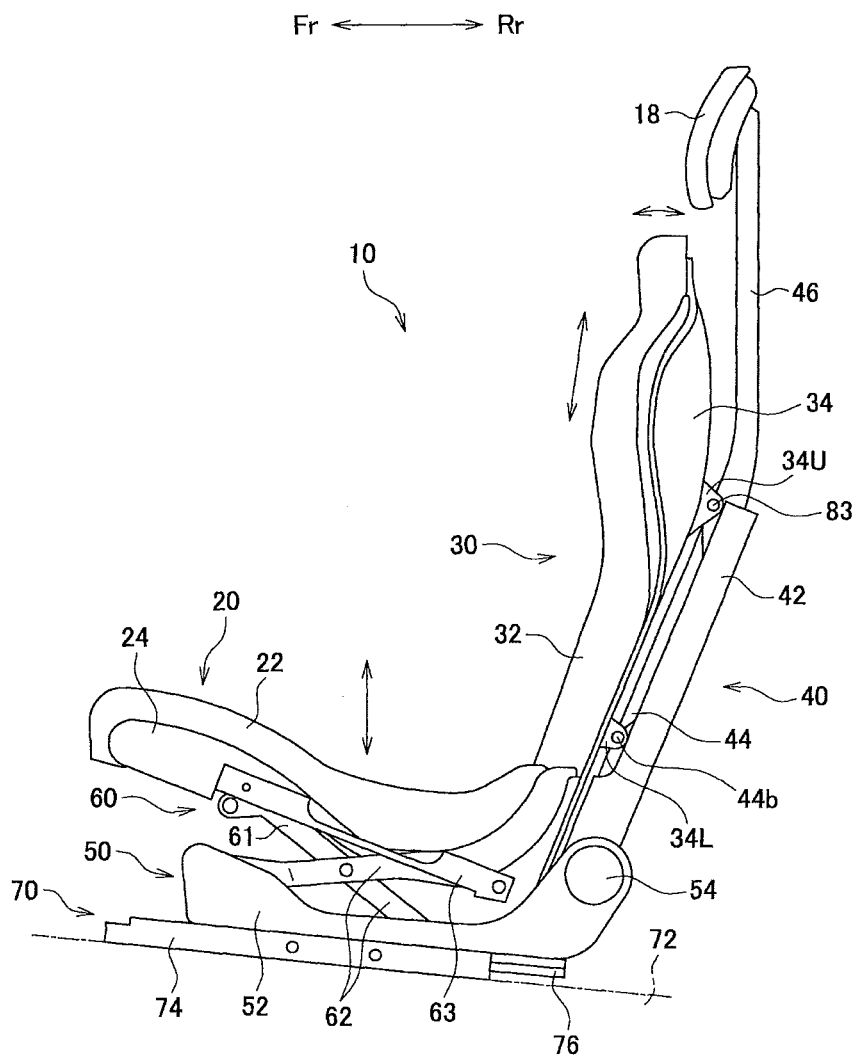
FIG. 1 is a left side view showing a seat according to an embodiment of this invention.

An embodiment of this invention will be described in detail, with reference to the accompanying drawings. The embodiment is a vehicle seat. In the drawing, Fr and Rr indicate the forward and backward directions with respect to the driver seated in the driver seat, and L and R indicate the leftward and rightward directions with respect to the driver.

Figure 2:
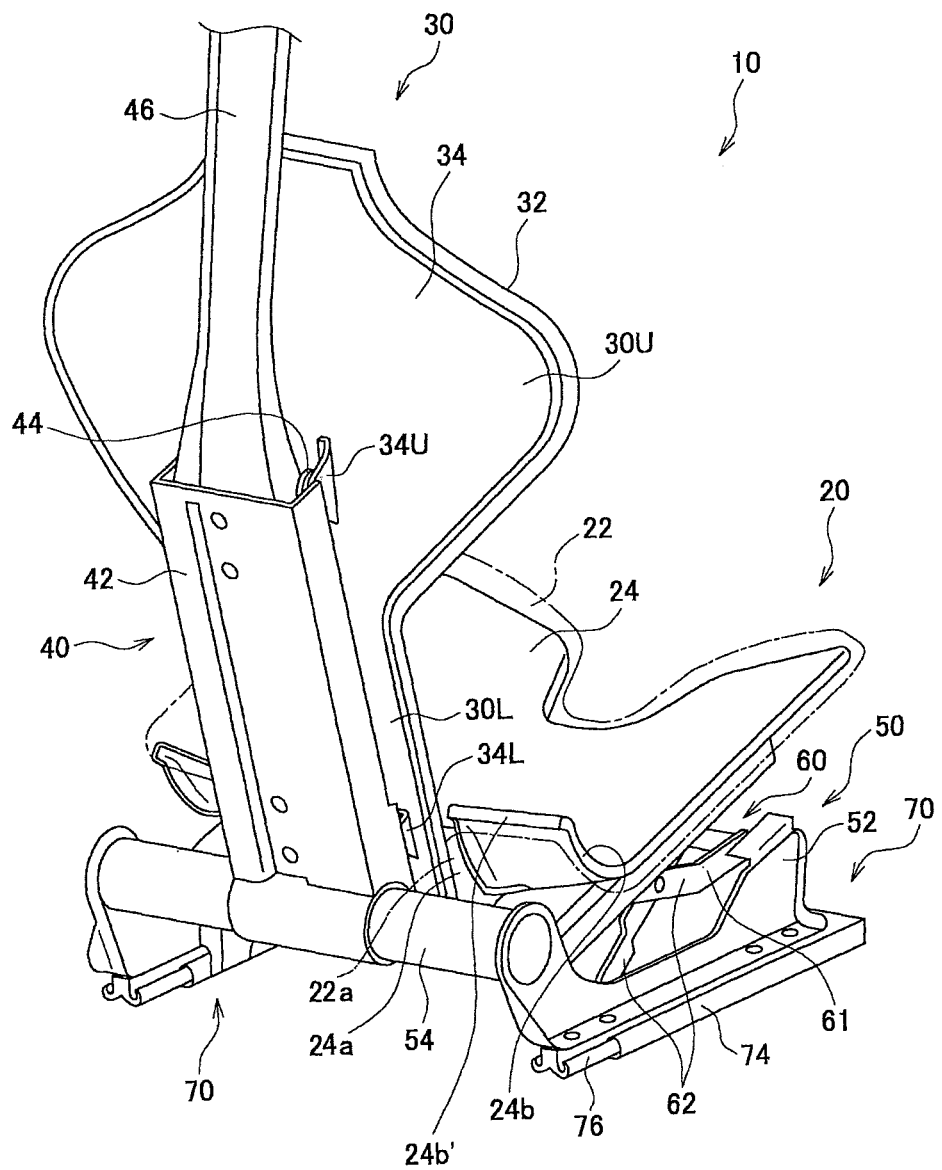
FIG. 2 is a partly sectional, perspective view showing the seat according to the embodiment of the invention, as viewed from the back.

As shown in FIG. 1 and FIG. 2, the seat 10 is a vehicle seat, and comprises a seat cushion 20, a seatback 30, a strut 40, a riser 50 serving as base, a lifting/lowering means 60, and a seat sliding mechanism 70.

The seat cushion 20 comprises a seat cushion unit 22 composed of a pad and a trim cover covering the pad, and a cushion panel 24 holding the seat cushion unit 22. The seatback 30 comprises a seatback unit 32 composed of a pad and a trim cover covering the pad, and a back panel 34 holding the seatback unit 32. The cushion panel 24 and the back panel 34 are made of, for example, fiber-reinforced plastic (FRP). The seat cushion unit 22 is adhered to the upper surface of the cushion panel 24. The seatback unit 32 is adhered to the front surface of the back panel 34.

In FIG. 2, the seat cushion unit 22 is indicated by a one-dot, dashed line, specifying the shape of the cushion panel 24.

The seat sliding mechanism 70 is of the type known to the public. The seat sliding mechanism 70 includes fixed rails 74 secured to the vehicle floor 72 and movable rails 76 inserted in the fixed rails 74, respectively, to slide back and forth. To the movable rails 76, the riser 50 is secured, and is used as seat base. The riser 50 has left and right side frames 52, a front coupling member coupling the front ends of the left and right side frames, and a rear coupling member coupling the rear ends of the left and right side frames 52. The rear coupling member is a hollow rod 54.

The lifting/lowering means 60 includes a seat lifter 61 arranged between the seat cushion 20 and the riser 50. The seat lifter 61 is of a known type such as X link type. More precisely, the seat lifter 61 comprises a pair of links 62 fastened with a pin, forming an X-shaped member. The links 62 are secured, at upper end with a pin to an upper bar 63, and at lower end with a pin to a lower bar (not shown). Of these two pins, the front-side pin can slide back and forth. The upper bar 63 is secured to the lower surface of the cushion panel 24, and the lower bar is provided inside the side frames 52 of the riser 50. So configured and provided between the seat cushion 20 and the riser 50, the seat lifter 61 can lift and lower the seat cushion 20.

The strut 40 has its lower end mounted on, or welded to, the rear coupling member, i.e., hollow rod 54 that couples the rear ends of the left and right side frames of the riser 50. Thus, the strut 40 is secure to the hollow rod 54, extending substantially upright (more precisely, incline rearward a little).

The strut 40 includes a main unit 42 and a movable pole 44. The main unit 42 is welded, at lower end, to the riser 50. The movable pole 44 is incorporated in the main unit 42, able to slide up and down. A pair of brackets 34U and another pair of brackets 34L are provided at the back of the back panel 34. The brackets 34U are vertically spaced from the brackets 34L. The brackets of either pair are spaced sidewise by the width of the movable pole 44. The brackets 34U and the brackets 34L secure the back panel 34 to the movable pole 44, and the seatback 30 can therefore slide up and down, together with the movable pole.

A strut 46 is secured to the back of the back panel 34. A headrest 18 is secured to the top of the strut 46. The headrest 18 can therefore be moved up and down together with the seatback 30, as the movable pole 44 is moved up and down.

The strut 46 is secured to the back of the back panel 34, and needs only to move up and down together with the seatback 30. It may be secured to the back of the back panel 34, by an appropriate method available.

As shown in FIG. 1, on the back of the back panel 34, the lower brackets 34L are provided at a lower part of the back panel 34, and the upper brackets 34U are provided at a little above the middle section of the back panel 34.

In FIGS. 3A to 3C and FIGS. 4A to 4D, only the seat cushion unit 22 and seatback unit 32 are shown. Neither the cushion panel 24 nor the back panel 34 is shown, thus simplifying the drawing. Needless to say, the cushion panel 24 and back panel 34 are shaped in conformity with the seat cushion unit 22 and seatback unit 32, respectively.

Figure 3A:
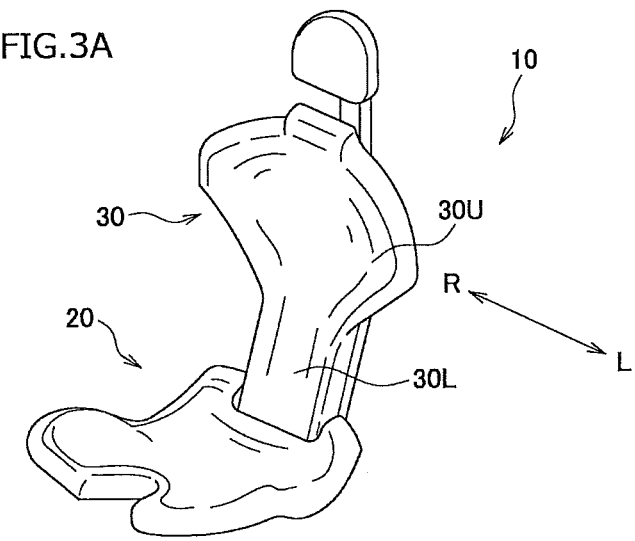
FIG. 3A is a perspective view showing the seat cushion and seatback of the seat according to the embodiment of the invention.
Figure 3B:
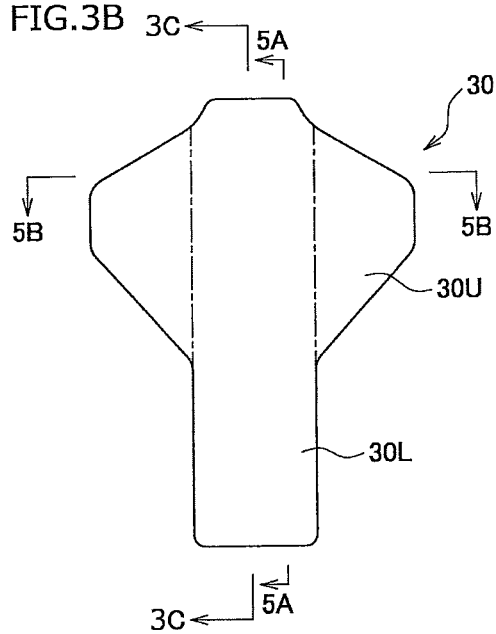
FIG. 3B is a front view of the seatback.

As shown in FIGS. 3A and 3B, the upper half 30U and lower half 30L of the seatback are shaped, greatly different in widths. The lower half 30L is narrower than the upper half 30U, and shaped like an elongate rectangle. That is, the upper half 30U of the seatback is shaped like a trapezoid, broader than the lower half 30L in the left-right direction of the seat 10. The lower half 30L is designed to support, in the main, that part of the occupant, which lies between the hips and lower ribs. The upper half 30U supports, in the main, the shoulder blades of the occupant.

Figure 3C:
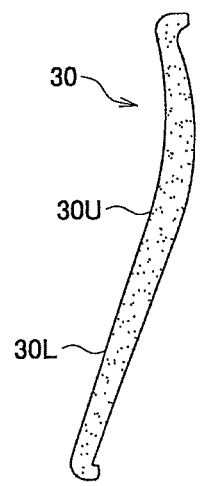
FIG. 3C is a vertical sectional view of the seatback, taken along line 3C-3C shown in FIG. 3B.

As shown in FIG. 3C, the front of the seatback 30 (composed of the upper and lower halves 30U and 30L) gently inclines backward, from the lower end to the upper end, and the upper part of the upper half 30U inclines a little forward. So curved, the front of the seatback 30 can smoothly support the occupant, at the hips, lower ribs and shoulder blades. The seatback 30 can therefore make the occupant feel well fit at the back of the occupant, while adjusting the height of the seatback 30, even if the occupant is a well-built person.

As shown in FIGS. 4A to 4D, the seat cushion unit 22 has a U-notch 22a in the middle part of the rear end. Thus, the rear end of the seat cushion unit 22 is shaped like letter U as seen from above, and has the left and right ends bulging upward from the bottom of the U-notch 22a. The U-notch 22a has a width in the left-right direction of the seat 10 and a length in the front-back direction of the seat which the lower half 30L of the seatback is loosely fitted.

As seen from FIG. 2, the cushion panel 24 has a U-notch 24a in the middle part of the rear end. The U-notch 24a corresponds to the U-notch 22a of the seat cushion unit 22 and overlaps with the U-notch 22a. In the U-notch 24a, the lower half 30L of the seatback is loosely fitted. The cushion panel 24 has left and right ends 24b, between which the U-notch 24a is provided. The left and right ends 24b extend upward. The rear end of the seat cushion unit 22 is folded back, forming a folded part 22b'. The folded part 22b' is engaged with the edge 24b' of the cushion panel (see FIG. 4D).

Figure 4B:
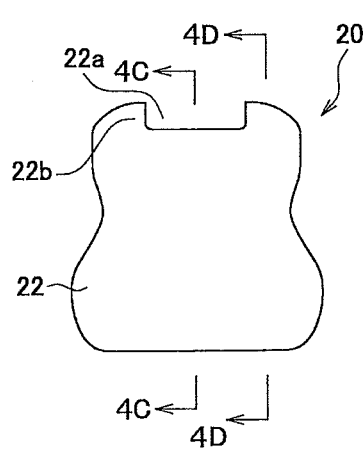
FIG. 4B is a plan view of the seat cushion.
Figure 4A:
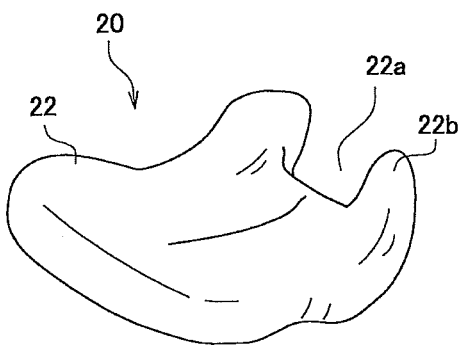
FIG. 4A is a perspective view of the seat cushion.
Figure 4C:
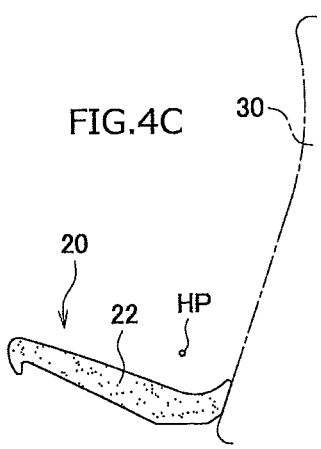
FIG. 4C is a vertical sectional view of the seat cushion, taken along line 4C-4C shown in FIG. 4B.
Figure 4D:
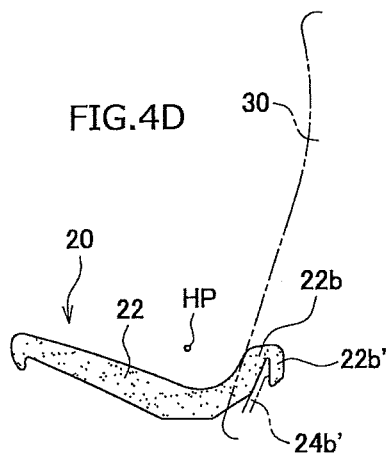
FIG. 4D is a vertical sectional view of the seat cushion, taken along line 4D-4D shown in FIG. 4B.

In FIGS. 4C and 4D, HP indicates the hip point of the occupant.

As described above, the lower half 30L of the seatback is narrower than the upper half 30U of the seatback, and the U-notch 22a loosely holding the lower half 30L is cut in the middle part of the rear end of the seat cushion 20. No gap is provided between the rear end of the seat cushion and the lower end of the seatback even if the seat cushion and the seatback is lifted or lowered, relative to each other. Therefore, the seat cushion 20 and the seatback 30 can be lifted or lowered, relative to each other, in order to adjust the position of the seatback in accordance with the occupant's physique (i.e., height).

The lower half 30L of the seatback 30 is thus made narrower than the upper half 30U, and the U-notch 22a for loosely holding the lower half 30L is made in the middle part of the rear end. This minor change in shape can adjust the position of the seatback (i.e., position of seat surface) in accordance with the occupant's physique (i.e., height).

The lower half 30L of the seatback 30 is loosely fitted in the U-notch 22a made in the middle part of the rear end of the seat cushion unit 22. Further, the left and right end parts 22b, defining the U-notch 22a, do not interfere with the seatback. The left and right end parts 22b can therefore have any shape desirable, without preventing the seat cushion 20 and the seatback 30 from moving up or down, relative to each other. The left and right end parts 22b extend upward. If they extend to a level higher than the U-notch 22a, the seat cushion 20 will may rap the occupant's buttocks from the sides. This prevents the occupant's buttocks from moving in the left-right direction of the seat 10. As a result, the occupant will feel his buttocks well fitted in the seat 10.

Figure 5A:
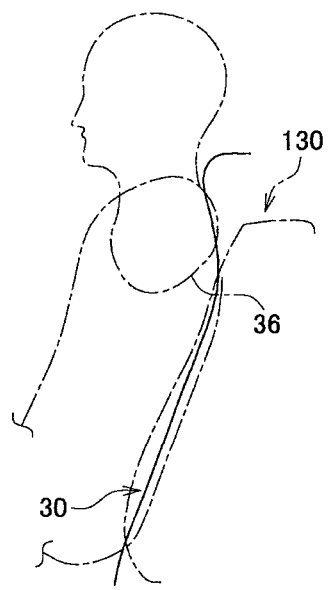
FIG. 5A shows a contour line of the seat surface of the seatback, taken along line 5A-5A shown in FIG. 3B.
Figure 5B:
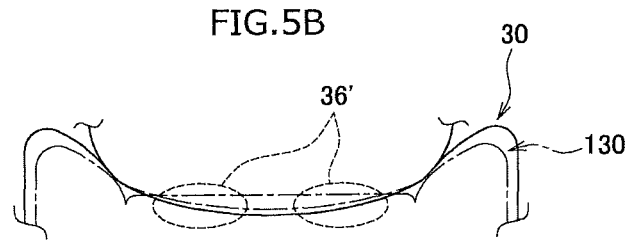
FIG. 5B shows a contour line of the seat surface of the seatback, taken along line 5B-5B shown in FIG. 3B.

As shown in FIGS. 5A and 5B, the seat surface of the seatback 30 is shaped in conformity with the occupant's shoulder blades 36.

The seatback 130 of the conventional vehicle seat does not extend up to a level where it may cover the shoulder blades 36 from the back. Further, the seatback 130 of the conventional vehicle seat is not shaped to wrap the left and right shoulder blades 36'.

In this invention, the seat surface of the seatback 30 first extends upward, along the shoulder blades 36, to a level where it covers the shoulder blades 36 from the back. In the left-right direction, the upper half 30U of the seatback 30 extends along the left and right shoulder blades 36. Thus, the seatback 30, or more precisely the seat surface of the seatback unit 32, is curved along the shoulder blades 36 in the up-down direction and in the left and right direction.

As described above, the seat surface of the seatback 30 curves in the up-down direction and also in the left-right direction, in conformity with the shoulder blades 36. The seatback 30 can make the occupant feel well fitted in the seat, without having bulging parts (known as "ridges"), ever if his or her shoulder (body) is broad.

In this embodiment, the seat lifter 61 lifts or lowers the seat cushion 20 with respect to the seatback 30, and a lifting/lowering mechanism other than the seat lifter 61 lifts or lowers the seatback with respect to the seat cushion. That is, the lifting/lowering means 60 includes a lifting/lowering mechanism (seatback lifting/lowering mechanism) 64, in addition to the seat lifter 61. The seatback lifting/lowering mechanism 64 will be described with reference to FIG. 6, FIG. 7 and FIGS. 8A and 8B.

Figure 6:
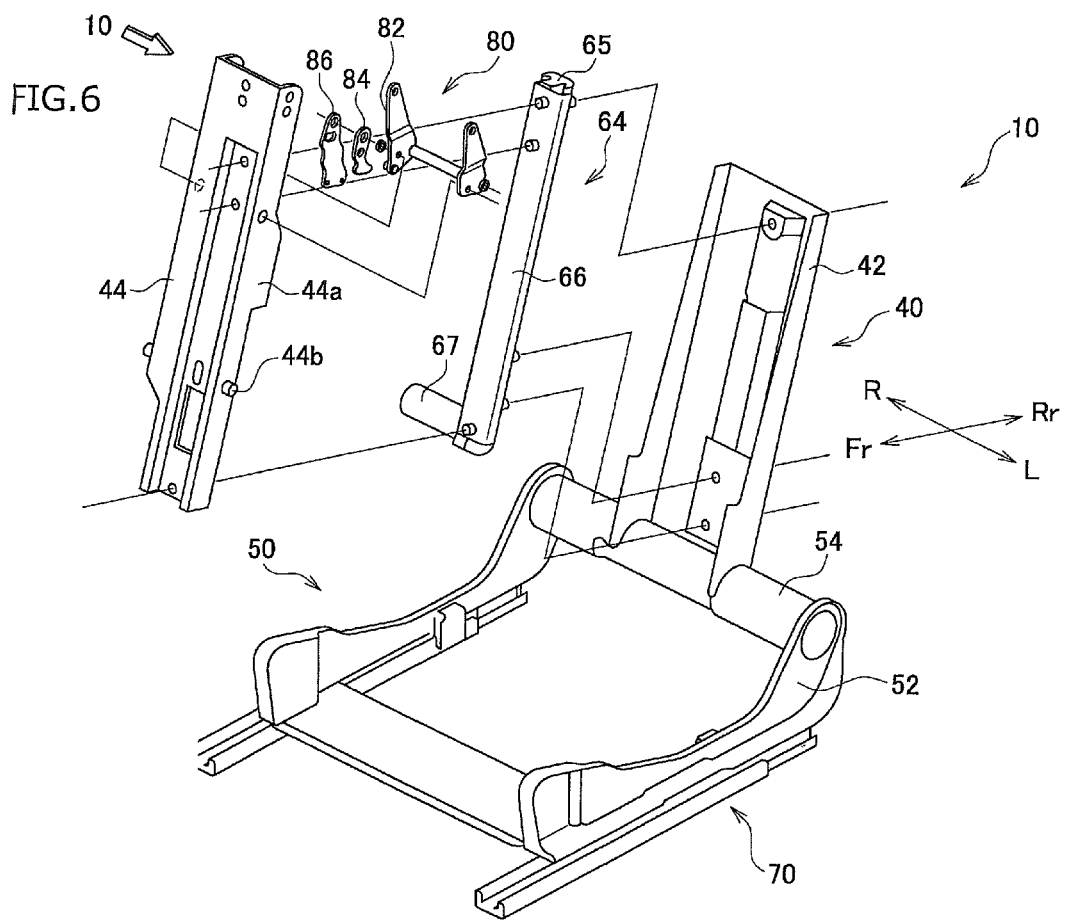
FIG. 6 is an exploded, perspective view of the seat according to the embodiment of the invention, not showing the seat cushion and the seatback.

As may be seen from FIG. 6 and FIGS. 8A and 8B, the seatback lifting/lowering mechanism 64 is based on the seat sliding mechanism known to the public. The mechanism 64 includes a fixed rail 65 and a movable rail 66 covering the fixed rail 65. The mechanism 64 is identical in configuration to the known seat sliding mechanism, except that the fixed rail 65 is provided inside the movable rail 66. Instead, the movable rail 66 may, of course, be provided inside the fixed rail 65.

The seat siding mechanism of the known type is configured to slide back and forth. By contrast, the seatback lifting/lowering mechanism 64 is configured to slide in vertical direction (thus able to move up and down).

The seatback lifting/lowering mechanism 64 is similar to the known seat sliding mechanism in basic configuration, and will not described in detail. In this embodiment, a motor 67 is mounted on the fixed rail 65, though not described here in detail. The driving force of the motor 67 is reduced and rotates a pinion gear (not shown) meshed with the lack (not shown) provided on the movable rail 66. Hence, if the motor 67 is driven, the movable rail 66 will move up or down along the fixed rail 65, while being guided by the fixed rail 65.

Figure 7:
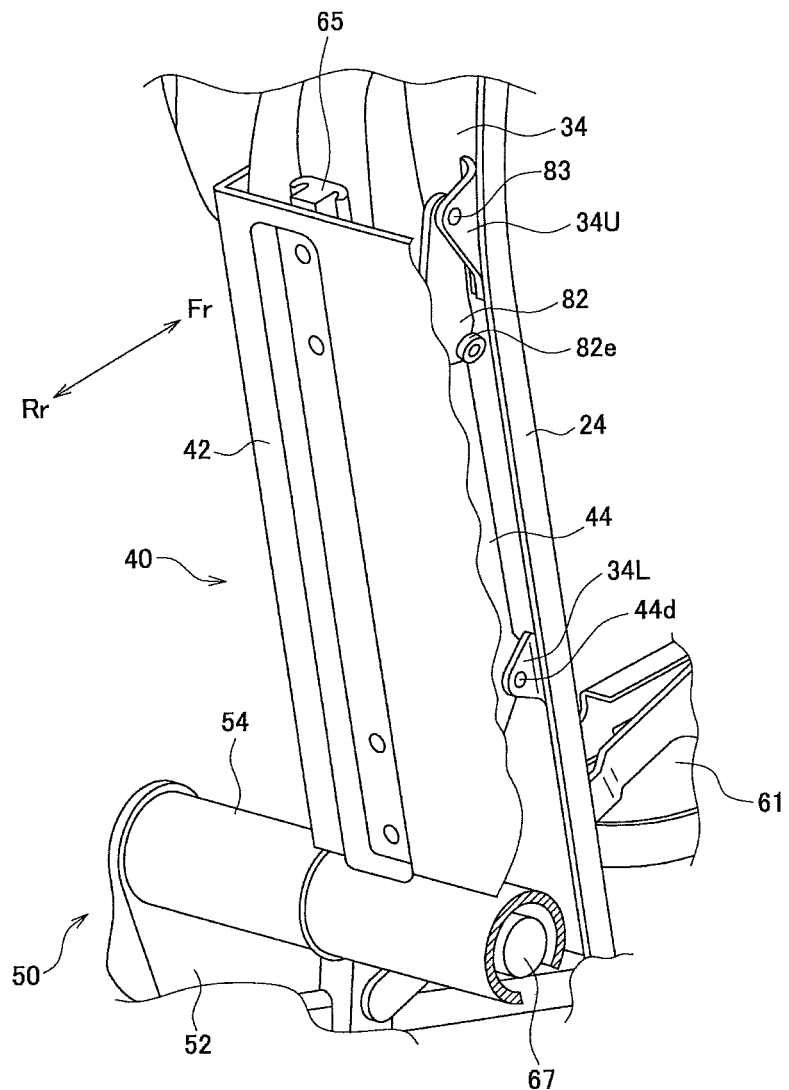
FIG. 7 is a magnified, partly sectional perspective view of the seat, as viewed from the back.

In the embodiment, the rear coupling member 54 coupling the rear ends of the left and right side frames 52 of the riser is a hollow rod. As shown in FIG. 7, the motor 67 of the seatback lifting/lowering mechanism 64 is incorporated in the hollow rod. The motor 67 is therefore concealed, not impairing the outer appearance of the seatback lifting/lowering mechanism 64.

The main unit 42 of the strut 40 is fastened to the fixed rail 65 and the movable pole 44 is fastened to the movable rail 66, for example by using bolts, respectively. The main unit 42 and the movable pole 44 have a U-shaped cross section, respectively. The main unit 42 opens at front, and its front is covered with the movable pole 44. The seatback lifting/lowering mechanism 64 is arranged between the main unit 42 and the movable pole 44.

Using a seat sliding mechanism of known type, the seatback lifting/lowering mechanism 64 can be small and light, and can yet easily move the movable pole 44 with respect to the main unit 42 of the strut 40. Secured to the movable pole 44, the seatback 30 is lifted or lowered, together with the movable pole. The seatback 30 can therefore be adjusted in the position of the seat surface, in accordance with the occupant's physique. This makes the occupant feel well fit in the seat.

The lower half 30L of the seatback is made narrower than the upper half 30U. The U-notch 22a is made in the middle part of the rear end of the seat cushion, and loosely holds the narrow lower half of the seatback. Therefore, no gap will be made between the rear end of the seat cushion and the lower end of the seatback even if the seatback 30 is lifted or lowered and thereby the seatback can be adjusted in position in accordance with the occupant's physique.

Moreover, the lower half 30L of the seatback 30, which is narrower than the upper half 30U, is loosely fitted in the U-notch 22a that is made in the middle part of the rear end of the seat cushion. Hence, the left and right end parts 22b, defining the U-notch 22a between them, does not interfere with the seatback 30, and the seatback 30 can be lifted and lowered without interfering with the seat cushion 20.

Needless to say, the seatback 30 can be adjusted in position in accordance with the occupant's physique, not impairing the occupant's feeling of being well fit in the seat 10, even when the seat lifter 61 lifts or lowers the seat cushion 20. Even after the seat cushion 20 has been lifted or lowered, no gap is made between the rear end of the seat cushion and the lower end of the seatback. Further, the seat cushion can be lifted and lowered, never interfering with the seatback 30.

As shown in FIGS. 6 and 7, two pins 44b protrude from the left and right walls 44a of the movable pole. The pins 44b are pivotally held, respectively in two support holes made in the left and right lower brackets 34L provided on the lower part of the back of the back panel 34.

Figure 9:
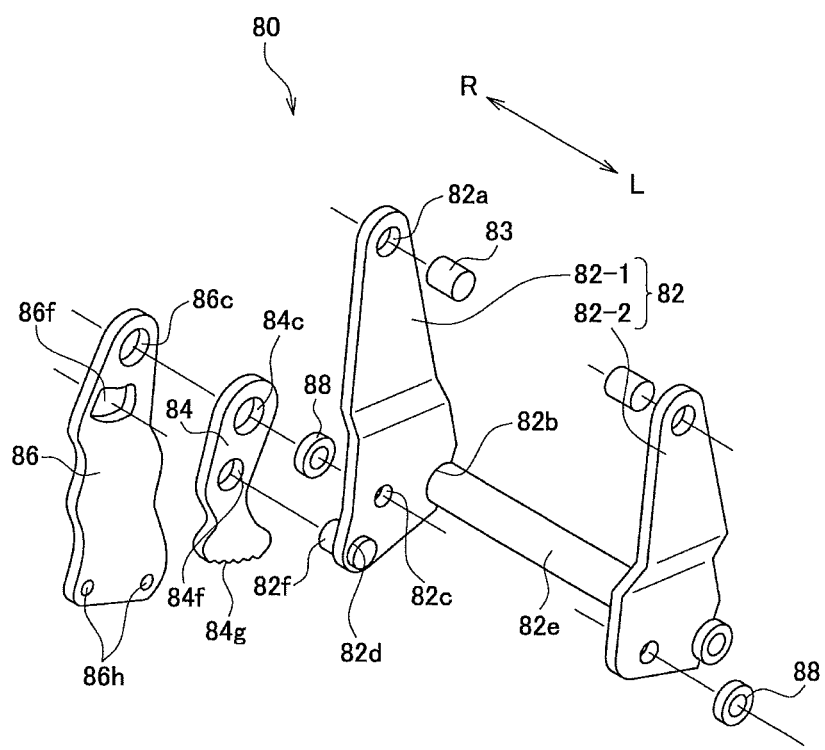
FIG. 9 is an exploded, perspective view of a seatback inclining mechanism (an inclination mechanism)

As shown in FIG. 9, the seat 10 further comprises an inclination mechanism 80 for the seatback configured to incline the seatback 30. The inclination mechanism 80 is provided on the movable pole 44, at a position well above the pins 44b protruding from the walls of the movable pole.

Figure 10:
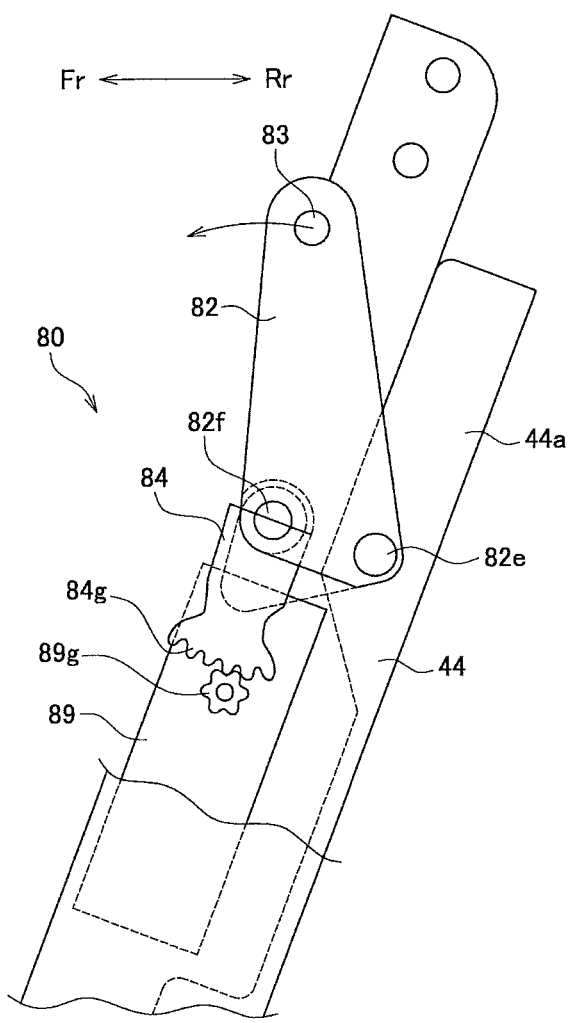
FIG. 10 is a partly sectional side view of a seat, as viewed in the direction of arrow 10 shown in FIG. 6.

As shown in FIGS. 6, 9 and 10, the inclination mechanism (or seatback inclining mechanism) 80 includes a main link 82, a drive link 84, and a regulation link 86. The main link 82 is composed of a pair of main links (or first and second main links) 82-1 and 82-2.

Each of the first and second main links 82-1 and 82-2 has one support hole 82a in one end (upper end), and two support holes 82b and 82c in the other end (lower end, or free end). The first main link 82-1 has another support hole 82d made in a corner of the lower end (free end) of the first main link 82-1.

A connecting rod 82e has its ends fitted, respectively in the support holes 82b made in the lower ends of the first and second main links 82-1 and 82-2. The first main link 82-1 and the second main link 82-2 are thereby coupled and can be moved together. Pins 83 pass through the support holes 82a and are pivotally supported, by the left and right brackets 34U provided at the upper part of the back of the back panel 34 (see FIG. 7). A pin (rotation control pin) 82f is fitted in the support hole 82d made in a lower corner of the first main link 82-1.

The drive link 84 and the regulation link 86 are arranged outside the first main link 82-1. A support hole 84c is made in the upper end of the drive link 84, and a support hole 86c is made in the upper end of the regulation link 86. Step pins (not shown) extend outwards from the left and right walls 44a of the movable pole, passing through the support holes 84c and 86c and a washer 88, and then through the support hole 82c of the first main link 82-1, and is pivotally supported by the side walls 44a of the movable pole. A step bolt (not shown) extends from outside, passing through another washer 88 and the support hole 82c of the second main link 82-2, and is secured to the side walls 44a of the movable pole 44. The main link 82 is thereby arranged between the left and right side walls of the movable pole 44.

Holes 84f and 86f, in which the rotation control pin 82f extending from the first main link 82-1 is inserted, are made in the drive link 84 and the regulation link 86, respectively. A section gear 84g is provided at the lower end of the drive link 84. The hole 86f of the regulation link 86 is an elongated hole arching around the support hole 86c made in the upper end of the regulation link.

The step pin extends through the support hole of the support hole 82c of the first main link 82-1, the support hole 84c of the drive link 84 and the support hole 86c of the regulation link 86. Further, the rotation control pin 82f extends from the first main link 82-1 and is inserted in the hole 84f of the drive link. The drive link 84 and the main link 82 can therefore rotate together.

Since the rotation control pin 82f is inserted in the arching elongated hole 86f of the regulation link 86, the rotation of the drive link 84 and main link 82 is limited to the distance the rotation control pin 82f moves in the elongated hole 86f.

Two holes 86h are made in the lower end of the regulation link 86. Using these holes 86h, the regulation link is bolted to the movable pole 44.

As shown in FIG. 10, an actuator 89 incorporating a motor (not shown) is secured to the movable pole 44. The section gear 84g of the drive link extends into the actuator 89 and is set in screw engagement with a pinion gear 89g. The drive link 84, which has the section gear 84g set in mesh with the pinion gear, rotates when the pinion gear 89g is rotated by the motor. As a result, the main link 82 rotates together with the drive link.

The pins 44b protruding from the left and right walls 44a of the movable pole 44, respectively, are pivotally supported in the support holes of the lower brackets 34L provided on the back panel. The back panel 34 can therefore incline forward and backward (or rotate) around the pins 44b pivotally, as much as allowed by the rotation control pin 82f and the elongated hole 86f.

A torque limiter (not shown) is provided on the actuator 89 and arranged between the motor and the pinion gear 89g, and therefore controls the output of the motor.

The main link 82 and the drive link 84, which rotate together, may be formed integral.

In other words, the drive link 84 may not be used, and the first main link 82-1 may extend downward from the rotation control pin 82f, and the section gear 84g may be provided on the lower edge of the first main link 82-1. Further, the rotation control pin 82f may be inserted directly into the elongated hole 86f. In this case, the back panel 34 can rotate forward and backward around the pins 44b pivotally, as much as allowed by the rotation control pin and the elongated hole.

In this configuration, the inclination mechanism 80 can be simplified in structure because the drive link 84 is not at all.

The lower brackets 34L are provided on the lower end of the back panel 34, and the seatback 30 is inclined (or rotated) around the pins 44b pivotally supported by the lower brackets 34L. That is, the center of rotation is set at the lower end of the seatback 30. This suppresses the back-and-forth motion of the lower half 30L of the seatback, which supports that part of the occupant, lying between the hips and lower ribs, even if the seatback 30 is inclined. The inclination of the seatback can therefore be adjusted without increasing the interference between the U-notch 22a made in the rear end of the seat cushion and the lower end of the seat back 30.

The torque limiter controls the output of the motor, which is transmitted to the pinion gear 89g. If another vehicle hits the rear of the vehicle having the seat 10, imposing an impact on the seat 10. In this case the pinion gear 89g slips, inclining the seatback 30 while absorbing the impact energy. This moderates the impact applied to the occupant, ensuring the safety of the occupant.

The back panel 34 is lifted or lowered, together with the movable pole 44, along the main unit (fixed pole) 42, in accordance with the occupant's physique, without impairing the occupant's feeling of being well fit in the seat 10. Hence, not only can the seatback 30 be adjusted in position, but also can the back panel 34 incline to the movable pole.

If the seatback 30 is inclined at the position to which it has been lifted or lowered, the seatback can be further adjusted in position in accordance with the occupant's physique, without impairing the occupant's feeling of being well fit at the seat surface of the seatback.

In the embodiment, the lifting/lowering means 60 configured to lift and lower the seat cushion 20 and the seatback 30, relative to each other, includes the seat lifter 61 for the seat cushion in addition to the seatback lifting/lowering mechanism 64. Further, the seat cushion 20 and the seatback 30 are configured to be lifted and lowered, independently of each other. Hence, the seat cushion 20 and the seatback 30 can be lifted and lowered relative to each other, for a longer distance. This reliably adjusts the seatback in position in accordance with the occupant's physique. Both an occupant much bigger than average persons and an occupant much smaller than average persons can feel well fit in the seat 10.

If lifted by the seat lifter 61, the seat cushion 20 will move back and forth. Nonetheless, the inclination mechanism 80 for the seatback 30 can adjust the inclination of the seatback. This gives the occupant a line of sight appropriate for his or her physique. The occupant can therefore feel fit in the seat 10, regardless of his or her physique, even while the seat lifter 61 is operating.

The inclination mechanism 80 for the seatback may be provided directly on the main unit 42, not on the movable pole 44, and the seatback 30 may be provided on the main unit 42 and may be inclined. In this case, the seatback will be adjusted in position in accordance with the occupant's physique if the seat lifter 61 lifts or lowers the seat cushion 20.

If the conventional seatback, which is composed of upper and lower halves, is lifted, a gap will exist between the upper and lower halves, and the occupant will no longer feel well fit on the seatback. By contrast, the seatback 30 of this invention is a single-piece product, never to have a gap even if it is lifted or lowered. This ensures the occupant a well-fit feeling on the seat surface of the seatback.

The strut 46, which has the headrest 18 on the top and is secured to the movable pole 44, is lifted or lowered together with the seatback 30, whereby the headrest is lifted or lowered. The headrest 18 can therefore support the occupant's head, not impairing the occupant's feeling of being well fit in the seat 10, even if the seat surface of the seatback 30 is adjusted in position in accordance with the occupant's physique.

As has been described, the seat 10 according to the invention can be adjusted in the position of the seatback (i.e., seat surface) in accordance with the occupant's physique, especially the occupant's height. Hence, the seat 10 can support the occupant at the hips, lower ribs and shoulder blades, making the occupant feel well fit in the seat.

While an embodiment of the invention has been described, it has been presented by way of example only, and is not intended to limit the scope of the invention. Any change and modification made within the scope of the invention are, of course, included in the present invention.

The embodiment described above is a vehicle seat, as in most cases. However, the present invention can be modified as any seats that have a seat cushion and a seatback, and is not limited to a vehicle seat.

What is claimed is:

1. A seat for use by an occupant, the seat comprising:
   a riser used as a base;
   a seat cushion arranged on the riser;
   a strut coupled at lower end to a rear end of the riser and provided at a rear of the seat cushion;
   a seatback secured to the strut and at the front surface thereof configured to hold the occupant's hips, lower ribs and shoulder blades; and
   a lifting/lowering means for lifting and lowering the seat cushion and the seatback relative to each other,
   wherein the seatback comprises a lower half structured to support the occupant's hips and lower ribs, and an upper half, integral with the lower half, structured to support the occupant's shoulder blades, the lower half being narrower than the upper half,
   the seat cushion has a U-notch formed in a middle part of a rear end for holding the narrow lower half of the seatback, not the upper half of the seatback, to lift and lower the seat cushion and the seatback relative to each other;
   left and right parts of the rear end of the seat cushion bulge to support the occupant's buttocks from the left and right sides and are located on the left and right sides of the U-notch.

2. The seat according to claim 1, wherein the strut comprises a fixed main unit coupled at the lower end to the rear end of the riser, and a movable pole securing the seatback at the front and guided by and slided along the fixed main unit; and the lifting/lowering means comprises a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail.

3. The seat according to claim 2, further comprising an inclination mechanism configured to incline the seatback forward with respect to the movable pole, left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod, having a section gear at a free end of the first main link;

a regulation link secured to the other end of the first main link, outside the first main link; and an actuator incorporating a motor having a pinion gear, secured to the movable pole and configured to drive the pinion gear and set in mesh with the section gear of the first main link, to rotate the main link, thereby to incline the seatback with respect to the movable pole, and the regulation link has an arching elongated hole, through which a pin extends from the other end of the first main link.

4. The seat according to claim 3, wherein the actuator of the inclination mechanism has a torque limiter that controls the output of the motor and transmits the output so controlled to the pinion gear.

5. The seat according to claim 2, further comprising an inclination mechanism configured to incline the seatback forward with respect to the movable pole, and left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod;

a drive link secured to the other end of the first main link and having a section gear at a free end;

a regulation link secured to the other end of the first main link, outside the drive link;

an actuator incorporating a motor having a pinion gear, secured to the movable pole and configured to drive the pinion gear and set in mesh with the section gear of the drive link, to rotate the drive link and the main link, thereby to incline the seatback with respect to the movable pole; and a pin extending from the other end of the first main link and passing through two holes made in the drive link and regulation link, respectively, the hole made in the regulation link being an arching elongated hole.

6. The seat according to claim 5, wherein the actuator of the inclination mechanism has a torque limiter that controls the output of the motor and transmits the output so controlled to the pinion gear.

7. The seat according to claim 2, further comprising an inclination mechanism configured to incline the seatback forward with respect to the movable pole, left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod, the first main link having a section gear at a free end;

a regulation link secured to the other end of the first main link, outside the first main link; and an actuator incorporating a motor having a pinion gear, secured to the movable pole and configured to drive the pinion gear and set in mesh with the section gear of the first main link, to rotate the main link, thereby to incline the seatback with respect to the movable pole, and the regulation link has an arching elongated hole, through which a pin extends from the other end of the first main link.

8. The seat according to claim 7, wherein the actuator of the inclination mechanism has a torque limiter that controls the output of the motor and transmits the output so controlled to the pinion gear.

9. The seat according to claim 1, wherein the strut comprises a fixed main unit coupled at the lower end to a rear end of the riser, and a movable pole securing the seatback at the front and guided by and slided along the fixed main unit; and the lifting/lowering means comprises:

a seat lifter provided between the riser and the seat cushion and configured to lift and lower the seat cushion, and a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail.

10. A seat for use by an occupant, the seat comprising:

a riser used as a base;

a seat cushion arranged on the riser;

a strut coupled at lower end to a rear end of the riser and provided at a rear of the seat cushion;

a seatback secured to the strut and at the front surface thereof configured to hold the occupant's hips, lower ribs and shoulder blades; and a lifting/lowering means for lifting and lowering the seat cushion and the seatback relative to each other, wherein the seatback comprises a lower half structured to support the occupant's hips and lower ribs, and an upper half, integral with the lower half, structured to support the occupant's shoulder blades, the lower half is narrower than the upper half, the seat cushion has a U-notch formed in a middle part of a rear end for holding the narrow lower half of the seatback, not the upper half of the seatback, to lift and lower the seat cushion and the seatback relative to each other, left and right parts of the rear end of the seat cushion bulge to support the occupant's buttocks from the left and right sides and are located on the left and right sides of the U-notch.

11. The seat according to claim 10, wherein the strut comprises a fixed main unit coupled at the lower end to the rear end of the riser, and a movable pole securing the seatback at the front and guided by and slided along the fixed main unit; and the lifting/lowering means comprises a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail.

12. The seat according to claim 11, further comprising an inclination mechanism configured to incline the seatback forward with respect to the movable pole, and left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod;

a drive link secured to the other end of the first main link and having a section gear at a free end;

a regulation link secured to the other end of the first main link, outside the drive link;

an actuator incorporating a motor having a pinion gear, secured to the movable pole and configured to drive the pinion gear and set in mesh with the section gear of the drive link, to rotate the drive link and the main link, thereby to incline the seatback with respect to the movable pole; and a pin extending from the other end of the first main link and passing through two holes made in the drive link and regulation link, respectively, the hole made in the regulation link being an arching elongated hole.

13. The seat according to claim 11, further comprising an inclination mechanism configured to incline the seatback forward with respect to the movable pole, and left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod, the first main link having a section gear at free end;

a regulation link secured to the other end of the first main link, outside the first main link; and an actuator incorporating a motor having a pinion gear, secured to the movable pole and configured to drive the pinion gear and set in mesh with the section gear of the first main link, to rotate the main link, thereby to incline the seatback with respect to the movable pole, and the regulation link has an arching elongated hole, through which a pin extends from the other end of the first main link.

14. The seat according to claim 10, wherein the strut comprises a fixed main unit coupled at the lower end to the rear end of the riser, and a movable pole securing the seatback at the front and guided by and slided along the fixed main unit; and the lifting/lowering means comprises:

a seat lifter provided between the riser and the seat cushion and configured to lift and lower the seat cushion, and a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail.

15. The seat according to claim 14, further comprising an inclination mechanism configured to incline the seatback forward with respect to the movable pole, and left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod;

a drive link secured to the other end of the first main link and having a section gear at a free end;

a regulation link secured to the other end of the first main link, outside the drive link;

an actuator incorporating a motor having a pinion gear, secured to the movable pole and configured to drive the pinion gear and set in mesh with the section gear of the drive link, to rotate the drive link and the main link, thereby to incline the seatback with respect to the movable pole; and a pin extending from the other end of the first main link and passing through two holes made in the drive link and regulation link, respectively, the hole made in the regulation link being an arching elongated hole.

16. The seat according to claim 14, further comprising an inclination mechanism configured to incline the seatback forward with respect to the movable pole, and left brackets and right brackets provided on a middle part and lower end of the back of the seatback, respectively, and spaced apart in up-down direction, and a pair of pins extending from the movable pole and pivotally supported on the lower brackets of the back of the seatback, respectively, and serving as rotation center of the seatback, wherein the inclination mechanism comprises:

first and second main links pivotally supported, by pins, on the upper brackets provided on the seatback, and connected together, at one end, by a connecting rod, the first main link having a section gear at free end;

a regulation link secured to the other end of the first main link, outside the first main link; and an actuator incorporating a motor having a pinion gear, secured to the movable pole and configured to drive the pinion gear and set in mesh with the section gear of the first main link, to rotate the main link, thereby to incline the seatback with respect to the movable pole, and the regulation link has an arching elongated hole, through which a pin extends from the other end of the first main link.

17. A seat comprising:
a riser used as a base;
a seat cushion arranged on the riser;
a strut coupled at lower end to a rear end of the riser and provided at a rear of the seat cushion;
a seatback secured to the strut and at the front surface thereof configured to hold an occupant's hips, lower ribs and shoulder blades; and
a lifting/lowering means for lifting and lowering the seat cushion and the seatback relative to each other,
wherein the seatback comprises a lower half structured to support the occupant's hips and lower ribs, and an upper half, integral with the lower half, structured to support the occupant's shoulder blades, the lower half is narrower than the upper half, and
the seat cushion has a U-notch formed in a middle part of a rear end for holding the narrow lower half of the seatback, to lift and lower the seat cushion and the seatback relative to each other,
left and right parts of a rear end of the seat cushion bulge to support the occupant's buttocks from the left and right sides and are located on the left and right sides of the U-notch;
the strut comprises a fixed main unit coupled at lower end to the rear end of the riser, and a movable pole securing the seatback at the front and guided by and slided along the fixed main unit; and
the lifting/lowering means comprises:
  a seat lifter provided between the riser and the seat cushion and configured to lift and lower the seat cushion, and
  a seatback lifting/lowering mechanism which is configured to lift and lower the seatback and the movable pole, which has a fixed rail and a movable rail, the fixed rail is secured to the fixed main unit, and the movable rail is mounted on or in, guided by and slided along the fixed rail,
the seat further comprising an inclination mechanism configured to incline the seatback forward with respect to the movable pole,
left brackets and right brackets provided on a middle part and lower end of the back of the seatback, respectively, and spaced apart in up-down direction, and
a pair of pins extending from the movable pole and pivotally supported on the lower brackets of the back of the seatback, respectively, and serving as rotation center of the seatback,
the inclination mechanism comprising:
  first and second main links pivotally supported, by pins, on the upper brackets provided on the seatback, and connected together, at one end, by a connecting rod;
  a drive link secured to the other end of the first main link and having a section gear at a free end;
  a regulation link secured to the other end of the first main link, outside the drive link;
  an actuator incorporating a motor having a pinion gear, secured to the movable pole and configured to drive the pinion gear and set in mesh with the section gear of the drive link, to rotate the drive link and the main link, thereby to incline the seatback with respect to the movable pole; and
  a pin extending from the other end of the first main link and passing through two holes made in the drive link and regulation link, respectively, the hole made in the regulation link being an arching elongated hole.

18. The seat according to claim 17, wherein the actuator of the inclination mechanism has a torque limiter that controls the output of the motor and transmits the output so controlled to the pinion gear.

* * * * *